April 17, 1962     G. R. ZAMBOLDI ET AL     3,030,544
CONTINUOUS FEED TYPE COPPER-COATED CARBON CUTTING RODS
Filed March 21, 1960
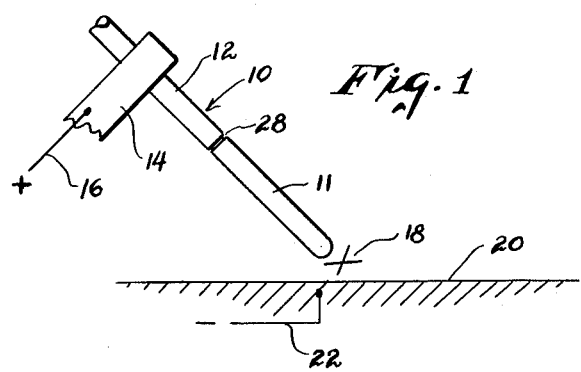
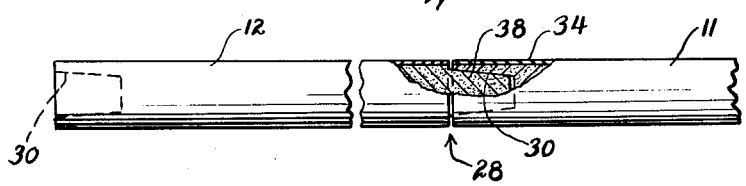
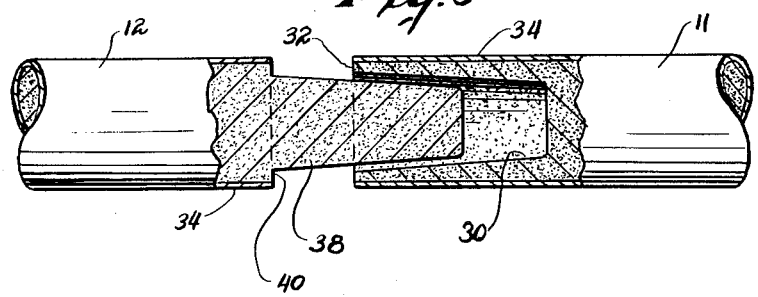
INVENTORS
GEORGE R. ZAMBOLDI
VALERY A. NOLAN
BY
Emery, Whittemore, Sandoe & Graham
ATTORNEYS

United States Patent Office 3,030,544
Patented Apr. 17, 1962

1

3,030,544
CONTINUOUS FEED TYPE COPPER-COATED CARBON CUTTING RODS
George R. Zamboldi and Valery A. Nolan, St. Marys, Pa., assignors to Speer Carbon Company, Inc., a corporation of Delaware
Filed Mar. 21, 1960, Ser. No. 16,274
7 Claims. (Cl. 313—355)

This invention relates to carbon rods which are used in the steel industry for cutting and cleaning steel. Such rods are gripped by a holder from which electric current is supplied to the rod for discharge as an arc to the steel work piece at the other end of the rod. It is the practice to make such rods by mixing carbonaceous materials with suitable binders and processing the mixture to suitable temperatures. The rods are copper-coated, and they are a well-known product in the industry.

In the use of these rods it is necessary to keep the arc from getting too close to the holder in order to prevent serious damage to the holder. As rods burn away, it has, therefore, been necessary to discard the short or stub ends and this has resulted in a normal loss of from 25% to 30% of the rods.

It is an object of this invention to use the entire length of carbon cutting and cleaning rods, and thus to avoid the previous loss which resulted from the discarding of short or stub ends.

The invention avoids the loss of stub ends by attaching them to the front ends of new rods in such a manner that the entire length of the old rod is used before any of the length of the new rod is burned away.

While it is known to connect stub ends of arc light electrodes to new lengths, and while the same broad idea has been used for the electrodes of electric smelting furnaces, the connections used for such purposes were not suitable for joining lengths of carbon cutting and cleaning rods of the character to which this invention relates. Prior to this invention, therefore, it was not known how this saving in the arc light and smelting arcs could be made in the field of carbon cutting and cleaning rods.

A more specific object of this invention is to provide a construction suitable for joining stub ends of carbon cutting and cleaning rods to the front ends of new rods. A joint of the necessary mechanical strength and of inexpensive construction are obvious requirements; but the more exacting problem with the rods involved is to obtain these requirements with a joint that does not have such increase in resistivity as to cause eruption and breaking of the small-diameter rods at the joints when subjected to the extremely high current flows that are used with carbon cutting and cleanings rods, and especially at connections where there is an interruption in the copper coating and all of the current must be transmitted locally through the carbonaceous material.

Other objects, features and advantages of the invention will appear or be pointed out as the description proceeds.

In the drawing, forming a part hereof, in which like reference characters indicate corresponding parts in all the views, FIGURE 1 is a diagrammatic view showing a carbon cutting rod held by a holder in working relation to a steel work piece and with a stub length of rod connected to the front end of a new length of rod;

2

FIGURE 2 is a greatly enlarged view, partly in section, showing the way in which successive lengths of rod are joined together; and FIGURE 3 is a greatly enlarged, fragmentary view, partly in section, showing the lengths of rod partially separated from one another.

In FIGURE 1 a carbon cutting or cleaning rod 10 includes a short or stub length 11 of partially-consumed rod secured to the forward end of a new length of rod 12 which is gripped in a holder 14 to which high-intensity electric current is supplied through a conductor 16. The construction of the holder is not illustrated in detail since such holders are well known in the art and it is sufficient to understand that the rod 12 is frictionally gripped by the holder 14, and that the holder can be released and moved to any new gripping position which is convenient for the particular job as the rod is burning away by discharge of an arc 18 from the end of the rod to a steel work piece 20.

The work piece 20 is connected to the other side of the electric circuit by a conductor 22, this being the conventional way in which the arc is established between the rod 10 and the work piece 20.

FIGURE 2 shows the way in which the rod lengths 11 and 12 are joined to one another at a connection 28. There is a tapered socket 30 formed in the end face of the rod length 11. This socket 30 increases in diameter toward the end of the rod length 11 but never reaches a diameter equal to the rod length 11. Thus there is an annular end face 32 (FIGURE 3) around the end of the socket 30 so that there is no feather edge of carbonaceous material around the socket. The copper coating around the outside surface of the rod length 11 is indicated by the reference character 34. There is no copper coating over the annular end face 32.

The front end of the rod length 12 is made with a frusto-conical end portion 38. This end portion 38 has a taper which is the same as that of the socket 30, and the taper is at a small angle so that the lengths of rod jam tightly together when the end portion 38 is inserted into the socket 30 and pressed into firm contact with the socket in an axial direction.

In the preferred construction, the angle of the taper is between 1° and 5° to the longitudinal axis of the rod. Thus the included angle between opposite sides of the socket 30 or end portion 38 is between 2° and 10°. This produces a tight connection with substantial pressure between the confronting tapered faces of the socket 30 and the end portion 38 and makes the use of cement unnecessary. A good connection for electrical contact is obtained and there is a substantial saving in time by having connections which do not require cement.

Around the base of the frusto-conical end portion 38, there is an annular end face 40 on the rod length 12, and there is no coating of copper on this end face 40.

The end of the rod length 12, remote from the frusto-conical end portion 38, is formed with a socket 30 (FIGURE 2) identical with the socket 30 of the rod length 11. As each new length of rod is burned away, therefore, it has a socket 30 at its rearward end for receiving a frusto-conical end portion of a new length of rod so that all stub ends can be used.

In practice, the rod lengths are made in diameters from about ¼" to 1" and the lengths of the rods are approximately one foot. It will be evident that the invention can be used on rods of other dimensions, but an important advantage of the invention is its suitability for carbonaceous rods of such small diameter.

In the manufacture of the rods, the frusto-conical end portion 38 is ideally equal to the depth of the socket 30. When so contructed, the confronting faces 32 and 40 contact with one another. It is not practical that the rods, however, be made without some manufacturing tolerances. These tolerances permit the socket to be deeper than the length of the frusto-conical end portion 38, but never shallower. Conversely, the tolerances permit the frusto-conical end portion 38 to be shallower than the socket 30, but never of greater length than the depth of the socket. Any variations in the tapers of the socket 30 and frusto-conical end portion 38 must leave the confronting faces 32 and 40 spaced from one another when the rods are joined. The clearance between the annular end faces of the rod lengths 11 and 12 are exaggerated in FIGURES 1 and 2 for clearer illustration. The commerical rods are made with tolerances which actually bring these end faces closer together, but even if they touch, they cannot be relied upon to carry the electric current because their contact with one another would not be under sufficient pressure to have low resistance.

The copper coating 34 on the rod lengths ordinarily carries a substantial part of the current but at the joints between rod lengths the copper circuit is interrupted and all of the current must be transmitted through the frusto-conical end portion 38 to the walls of the socket 30; and this current must pass across the connection without overheating the carbonaceous material. Withtout a tight connection, and substantial pressure between the confronting faces, high current rates will cause over-heating and expansion or "eruption" at the joint with resulting breaking of the rod length having the socket in its end face.

The necessary pressure between the carbonaceous faces is obtained by having the small angle of taper and by having accurately equal angles of taper for the socket and the frusto-conical end portion 38. The necessary area, for keeping current intensity within acceptable limits, is obtained by having a substantial longitudinal length for the socket 30 and frusto-conical end portion 38. The area of contact between the confronting carbonaceous faces is at least as great as the transverse cross section of the rod length between joints, and preferably greater because of the interruption of the continuity of the copper circuit at the joints. In practice, it has been found that a socket depth and end portion length greater than the rod diameter is suitable, and preferably an axial length equal to about one and one-half times the rod diameter. This presupposes that the average diameter of the socket 30 and the end portion 38 will be comparatively large since the areas of the contacting faces depend upon their diameter as well as upon their axial length.

It is advantageous to have the diameters of the tapered faces as large as possible; but practical considerations require that the maximum diameter of the tapered surfaces be substantially less than the diameter of the carbonaceous portion of the rod so as to avoid a feather edge at the entrance to the socket. Such an edge would seriously reduce the mechanical strength of the rods, not only when in use but also during shipment and handling. The most serious difficulty here would be the possibility of small particles from a feather edge falling between the frusto-conical end portion 38 and the tapered wall of the socket with the result that firm surface contact between the tapered surfaces would be prevented.

A radial width for the end face 32 equal to approximately one-eighth of the diameter of the rod has been found satisfactory in practice. This value is given by way of illustration. Extra axial length of the tapered surfaces compensates for reduction in diameter when maintaining the area of contact in the design of the rods; but it is undesirable to make the diameters of the tapered portions small because this reduces the mechanical strength of the frusto-conical end portion 38 and it also increases the path of the current flow of that portion of the current which must travel from the copper coating on one rod length, through the carbonaceous material of the connecting portions of the rod lengths, and outwardly again through the carbonaceous material to the copper coating on the next rod length. Stated another way, small-diameter tapers have the disadvantage of increasing the radial width of the gap in the conductor cross section at the junction of two rod lengths.

The preferred embodiment of the invention has been illustrated and described. Terms of orientation in the description and in the claims are, of course, relative. Various changes and modifications can be made, and some features can be used in different combinations without departing from the invention as defined in the claims.

What is claimed is:

1. A carbon rod assembly for cutting and cleaning steel by means of an electric arc including a first length of solid rod having a socket at its upper end with an annular end face surrounding the socket where said socket opens through the upper end face of the rod, a second length of rod having a lower end face with an annular outer portion, and a frusto-conical inner portion extending beyond the annular outer portion, a metal coating on the outside surface of each of the rods for conducting electric current, the socket and the frusto-conical portion tapering to a smaller diameter as they extend downward and having the same taper as one another within a range of 2–10 degrees of included angle, the lengths of rod being secured together by permanent jamming of the frusto-conical portion in the socket, with the confronting tapered faces in direct carbon-to-carbon contact with one another and in firm electrical contact with one another over sufficient area to carry the full current of both the rod lengths and their coating, at the connection of one rod length to the other, the end face of the frusto-conical portion of the second rod being spaced from the end face of the socket and the annular end faces of the rod lengths being spaced from one another with a resulting gap in the continuity of the metal coating, and the assembly being free of any connecting structure beyond the outside surface of the metal coating on the rod lengths.

2. The carbon cutting rod assembly described in claim 1 and in which the socket is at least as long as the frusto-conical portion.

3. The carbon cutting rod assembly described in claim 1, and in which the contacting faces of the socket and the frusto-conical portion have an axial extent greater than the diameter of the rod lengths.

4. The carbon cutting rod assembly described in claim 3 and in which the area of contact of the socket and the frusto-conical portion is at least as great as the transverse cross section of the rod lengths.

5. A carbon rod for cutting and cleaning steel by means of an electric arc including a length of solid rod having a socket at its upper end with an annular end face surrounding the socket where said socket opens through the upper end face of the rod, and having a lower end face with an annular outer portion, and a frusto-conical inner portion extending beyond the annular outer portion, a metal coating on the outside surface of the rod for conducting electric current, the socket and the frusto-conical portion tapering to a smaller diameter as they extend downward and having the same taper as one another and within a range of 2–10 degrees of included angle, whereby the length of rod can be secured to a similar length of rod by permanently jamming of the frusto-conical portion of one rod in the socket of the other rod with the confronting tapered faces in direct carbon-to-carbon contact with one another and in firm electrical contact with one another over an area that carries the full current of both of the rod lengths, the taper of the frusto-conical portion being correlated with that of the socket so that the end face of the frusto-conical portion of a rod length is spaced from the end face of the socket of a similar rod length with a resulting gap in the continuity of the metal coating on the connected rod lengths.

6. The carbon rod described in claim 5, and in which the diameter at the large end of the frusto-conical portion is less than approximately three quarters of the diameter of the rod.

7. The carbon rod described in claim 6, and in which the axial length of the tapered surface of the frusto-conical portion is at least as short as the axial depth of the socket, and is substantially greater than the diameter of the rod length.

References Cited in the file of this patent

UNITED STATES PATENTS

| | | |
|---|---|---|
| 2,120,243 | Droll | June 14, 1938 |
| 2,412,081 | Droll | Dec. 3, 1946 |
| 2,657,326 | McCarty | Oct. 27, 1953 |